United States Patent [19]

Impink, Jr.

[11] Patent Number: 5,351,200

[45] Date of Patent: Sep. 27, 1994

[54] PROCESS FACILITY MONITOR USING FUZZY LOGIC

[75] Inventor: Albert J. Impink, Jr., Murrysville, Pa.

[73] Assignee: Westinghouse Electric Corporation, Pittsburgh, Pa.

[21] Appl. No.: 796,291

[22] Filed: Nov. 22, 1991

[51] Int. Cl.$^5$ ............................................. G06F 15/20
[52] U.S. Cl. .................................. 364/550; 364/130; 395/900; 395/906; 395/907
[58] Field of Search ................ 364/130, 550; 395/900, 395/906, 907

[56] References Cited

U.S. PATENT DOCUMENTS

| | | | |
|---|---|---|---|
| 4,115,848 | 9/1978 | Kogure et al. | 364/154 |
| 4,140,920 | 2/1979 | Dao et al. | 307/464 |
| 4,298,955 | 11/1981 | Munday et al. | 364/500 X |
| 4,552,718 | 11/1985 | Impink, Jr. et al. | 376/216 |
| 4,644,479 | 2/1987 | Kemper et al. | 364/550 |
| 4,740,349 | 4/1988 | Loftus et al. | 364/140 X |
| 4,783,307 | 11/1988 | Galligan et al. | 364/579 X |
| 4,803,039 | 2/1989 | Impink, Jr. et al. | 364/188 X |
| 4,815,014 | 3/1989 | Lipner et al. | 364/550 |
| 4,908,775 | 3/1990 | Palusamy et al. | 364/508 |
| 4,910,691 | 3/1990 | Skeirik | 364/138 X |
| 4,916,628 | 4/1990 | Kugler | 364/492 |
| 4,975,865 | 12/1990 | Carrette et al. | 364/550 X |
| 5,012,430 | 4/1991 | Sakurai | 364/148 X |

OTHER PUBLICATIONS

Lee: "Fuzzy Logic in Control Systems: Fuzzy Logic Controller Part I"; IEEE Transactions on Systems, Man and Cybernetics, vol. 20, No. 2, Mar./Apr. 1990; pp. 404–418.

Wang et al., "Censored Life–Data Analysis Using Linguistic Variables", IEEE Transactions on Reliability, vol. 37, No. 1, Apr. 1988, pp. 111–116.

Zadeh, Lotfi, "Outline of a New Approach to the Analysis of Complex Systems and Decision Processes", IEEE Transactions on Systems, Man, and Cybernetics, vol. SMC-3, No. 1, Jan. 1973, pp. 28–44.

Tong, Richard, "A Retrospective View of Fuzzy Control", Systems, Fuzzy Sets and Systems, vol. 14, (1984), pp. 199–210.

Umbers et al., "An Analysis of Human Decision–Making In Cement Kiln Control and the Implications for Automation", Int. J. Man–Machine Studies, vol. 12, (1980), pp. 11–23.

Larsen, P. Martin, "Industrial Applications of Fuzzy Logic Control", Int. J. Man–Machine Studies, vol. 12, (1980), pp. 3–10.

King, P. et al., "The Application of Fuzzy Control Systems to Industrial Processes", Automatica, vol. 13, 1977, pp. 235–242.

Primary Examiner—Edward R. Cosimano

[57] ABSTRACT

A method for monitoring operation of a process facility comprising the steps of storing at least one planned sequence of hypothesized plant states using multi-valued logic to define calculation of a congruence factor for each of the hypothesized plant states; wherein said storing step includes storing relationships between the multi-valued logic variables defined by a maximum value function when any of the multi-valued logic variables in a first relationship may be true and defined by an average function when all of the multi-valued logic variables in a second relationship are expected to be true; converting data from the process facility into values of multi-valued logic variables; wherein said converting step assigns to the multi-valued logic variables numerical values corresponding to likelihood of truth; calculating the congruence factor for each of the hypothesized plant states in the at least one planned sequence using the multi-valued logic variables; and identifying a current plant state by comparing the congruence factor of each of the hypothesized plant states based and selecting the state having the highest congruency factor.

17 Claims, 6 Drawing Sheets

TABLE 1

| INPUT | LOGIC VARIABLE |
|---|---|
| 21 | BOILER FEED PUMP 201 (RUNNING) |
| 22 | BOILER FEED PUMP 202 (RUNNING) |
| 23 | BOILER FEED PUMP 201 (RUNNING AT RATED SPEED) |
| 24 | BOILER FEED PUMP 202 (RUNNING AT RATED SPEED) |
| 25 | VALVE 207 (>30% OPEN) |
| 26 | CONDENSATE PUMP 210 (RUNNING) |
| 27 | CONDENSATE PUMP 220 (RUNNING) |
| 28 | CONDENSATE PUMP 230 (RUNNING) |
| 29 | VALVE 200-1 (OPEN) |
| 30 | VALVE 200-2 (OPEN) |
| 31 | VALVE 204A-1 (OPEN) |
| 32 | VALVE 204A-2 (OPEN) |
| 33 | VALVE 205 (OPEN) |
| 34 | PRIMARY SUPERHEATER PRESSURE (>2950 PSIG) |
| 35 | PRIMARY SUPERHEATER TEMPERATURE (>400°F) |
| 36 | CATION CONDUCTIVITY (>1 MICROMHO) |

*FIG.2B*

PROCESS FACILITY MONITOR USING FUZZY LOGIC

BACKGROUND OF THE INVENTION

1. Field of The Invention

The present invention is directed to a system for monitoring a process facility, such as an electrical power generating plant and, more particularly, to a process facility monitoring system using a novel form of fuzzy logic to identify a current plant state.

2. Description of the Related Art

There are several automated systems which monitor, diagnose or automatically control the operation of complex process facilities, such as electrical power generating plants. Separation of control duties between human operators and the automated system vary from one system to another. Some systems, such as those disclosed in U.S. Pat. Nos. 4,803,039 and 4,815,014 and 5,068,080 may be paced by the automated system with human operators executing the instructions provided by the system. More commonly, the automated systems merely provide advice and the human operator is expected to exercise judgment in following or ignoring the advice provided by the automated system. The latter systems are appropriate for situations in which the human operator is likely to be experienced, such as start-up of a portion of the facility after scheduled maintenance, while the former systems are appropriate when the human operator is likely to be inexperienced in handling a situation, such as situations involving the use of emergency operating procedures at a nuclear power plant.

It is not uncommon for automatic advisory systems to use artificial intelligence or an expert system to provide advice to the human operator. As is well known, expert systems typically use forward or backward chaining logic to determine a diagnosis or recommended course of action. Some expert systems allow for uncertainty regarding the quality of input data and commonly quantitative data is converted into values such as high, very high, low, etc. for use in the logic statements. However, typically Boolean logic is used, occasionally with an uncertainty factor associated with the resulting diagnosis. Thus, operators may receive messages such as, "Temperature is high and flow rate is low, therefore pump XXX is probably not operating properly."

Typically, the ability of expert systems to handle gradations of data values is limited. It is necessary to know the cause or solution of a problem at the time the expert system rules are written to provide useful advice. As a result, a large rulebase is required to provide advice for the operation of a complex facility. An example of an expert system for this purpose is disclosed in U.S. Pat. No. 4,644,479 to Kemper et al.

Other techniques are also known for identifying the plant state of a complex facility. For example, U.S. Pat. No. 4,552,718 to Impink, Jr. et al. discloses a status tree technique which has virtually no tolerance for uncertainty. U.S. Pat. No. 4,298,955 to Munday et al. uses what may be referred to as a template matching technique in which all data obtained from sensors in a plant are assigned equal worth and are used to define a variety of anticipated plant states. During operation of the complex facility, data is obtained from sensors in the plant to provide physical parameter values and equipment settings which are tested against each of the templates until a best match is obtained. If the actual plant state is close to one of the anticipated plant states, there is no problem. However, when, for example, more than one piece of data is different from what is expected for one of the templates, it can be difficult to distinguish that template from another template. Stated another way, the template matching method does not have a high tolerance for uncertainty or "fuzziness".

Techniques for handling "fuzziness" or uncertainty of existence of a condition or data values have been developed in other fields. Fuzzy set theory is at least 25 years old and approximately 20 years ago it was suggested that the theory could be applied to system control. It has been over 15 years since a fuzzy logic controller was successfully used to operate a small boiler steam engine and a simulated stirred tank. One of the most successful applications of a fuzzy logic controller to a process facility involves control of a cement kiln. However, there is no known application of a fuzzy logic controller for a complex facility. Known methods for controlling complex facilities which tolerate uncertainty have other drawbacks. For example, the method disclosed in U.S. Pat. No. 4,644,479 cannot be easily applied to process facilities where a parameter value or the state of a particular piece of plant equipment routinely changes in a sequence of operations, such as drain valves which are initially closed, subsequently opened and eventually reclosed during start up of the facility.

SUMMARY OF THE INVENTION

An object of the present invention is to monitor operation of a complex process facility, especially when the facility is involved in a preselected sequence of transient changes in facility state, and to provide periodically to a human operator an indication of current facility state during progression through the sequence of transient changes in facility state.

Another object of the invention is to provide a human operator of a complex facility with a quantitative measure of confidence in the validity of an indication of current facility state based on both actual deviations of measured digital and analog facility parameter values from expected values and the quality of the measured values, derived from, e.g., identifiable sensor malfunction characteristics, used in determining the indication of current facility state.

A further object of the present invention is to derive a quantitative measure of confidence in the validity of an indication of current facility state using fuzzy logic-based classifications of deviations of measured analog parameter values from expected values, using classifications such as "within the expected tolerance band", "just outside the expected tolerance band" and "well outside the expected tolerance band", and using fuzzy logic-based classifications of data quality, such as, "data meet all requirements against which validity can be checked" (including redundancy checks, signal-to-noise checks, etc.), "data meet most, but not all requirements" (e.g., data derived from single, non-redundant sensors, data with low signal-to-noise ratios, etc.) and "data clearly not valid" (e.g., data indicative of a failed sensor).

A still further object of the present invention is to define relationships between a plurality of partially independent operations, each comprising a sequence of planned states, so that a likely current state of each operation can be determined.

Yet another object of the present invention is to identify individual deviations of measured digital and analog facility parameter values from expected values after a best determination of the current facility state has been made.

The above objects are attained by providing a method for monitoring operation of a process facility, comprising the steps of: storing at least one planned sequence of hypothesized plant states using multi-valued logic to define calculation of a congruence factor for each of the hypothesized plant states; converting data from the process facility into values of multi-valued logic variables; calculating the congruence factor for each of the hypothesized plant states in the at least one planned sequence using the multi-valued logic variables; and identifying a current plant state by comparing the congruence factor of each of the hypothesized plant states. Multi-valued logic is used to indicate gradations of true and false, preferably by assigning real numbers between $-1.0$ and $+1.0$. congruence factor is preferably a numerical value providing an indication of proximity of the current plant state to a hypothesized plant state, where $-1.0$ indicates a complete mismatch and $+1.0$ indicates a perfect match. Preferably, the calculation of each congruence factor is defined using relationships between the multi-valued logic variables, where a maximum value function is used when it is sufficient for any one of a group of the multi-valued logic variables to be true and an average function is used when all of the multi-valued logic variables in a group are expected to be true. In other words, the equivalent of a Boolean OR is a maximum value function and the equivalent of a Boolean AND operation is an average function.

In the preferred embodiment the quality or uncertainty of data is indicated by using a value between $-1.0$ and $+1.0$, where $-1.0$ indicates certainly false, $+1.0$ indicates certainly true and $0.0$ indicates total uncertainty. To avoid a result of total uncertainty when a group of multi-valued logic variables are OR'ed and none of the logic values are significantly true, an average function may be used instead of the maximum value function when the maximum value function selects a value very close to $0.0$ due to bad data quality. Thus, if four multi-valued logic variables are OR'ed and three of them are close to $-1.0$, while the fourth is close to $0.0$ due to bad data quality, instead of indicating a result of near total uncertainty, the result will be approximately $-0.7$ or lower, indicating a false value with significant certainty.

According to the present invention after a plant state is identified as a likely candidate for the current plant state, the multi-valued logic variables used to calculate the congruence factor for that plant state may be individually "toggled" or temporarily changed in value to determine which changes will increase the congruence factor. The human operator is informed of those equipment states or physical parameter values which if changed would improve the congruence factor and thereby would bring the actual plant state closer to the hypothesized plant states in the planned sequence. In addition, other information about the plant state which may not be used to identify the plant state may also be displayed to the human operator.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTIONS OF THE DRAWINGS

FIG. 2B is a table illustrating typical logic variables;

DESCRIPTION OF THE PREFERRED EMBODIMENT

Figure 1:
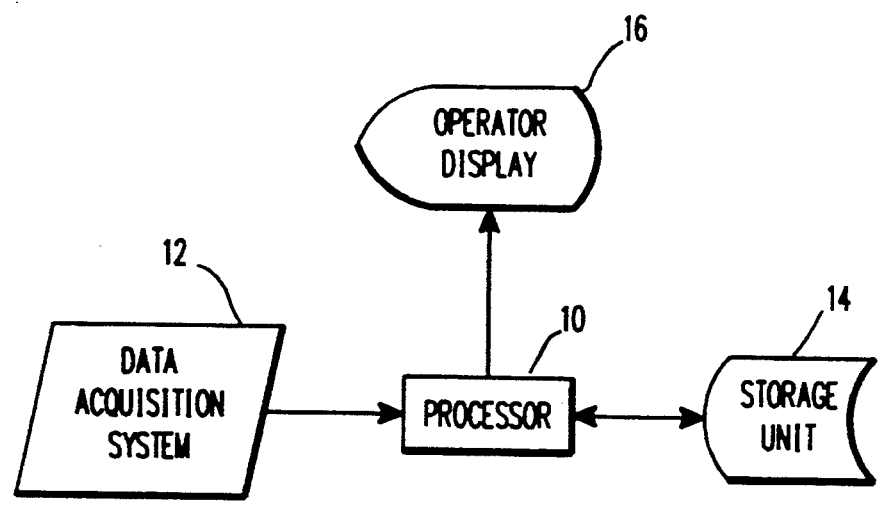
FIG. 1 is a block diagram of a computer system to which the present invention can be applied.

As illustrated in FIG. 1, a system according to the present invention includes a processor 10 for performing calculations and comparisons and a data acquisition system 12 for obtaining data from the process facility being monitored. The type of processor 10 used will depend upon the amount of data needed to be processed to determine all possible plant states of interest, the speed with which plant states need to be rechecked and the complexity of any other functions which the processor 10 may perform. In the case of a monitor for an electrical power generating plant, a SUN workstation from SUN Microsystems of Mountain View, Calif. may be used as processor 10. The processor 10 is also connected to a storage unit 14 which stores the data obtained by the data acquisition system 12, intermediate values and representations of the possible plant states defining calculation of congruence factors. An operator display 16 is used to provide a human operator with messages generated by the system. The storage unit 14 and operator display 16 may be selected from among conventional devices capable of being connected to the processor 10. The data acquisition system 12 may be selected from conventional data acquisition systems capable of handling the amount and type of instrumentation required to obtain the data needed to calculate congruence factors as described below.

A system according to the present invention differs from a system using the template matching technique of U.S. Pat. No. 4,298,955 in a number of ways. Most importantly, instead of equally weighting all of the data used to evaluate the possibility of a plant state, a relationship is defined between the data giving greater emphasis to some data than to other data. The relationship defined for each plant state uses a variation of fuzzy logic. The "fuzziness" of the data is permitted by using multi-valued logic variables, instead of Boolean variables with values of TRUE or FALSE. In the preferred embodiments, the logic variable values range between $-1.0$ and $+1.0$. The single decimal digit in this range is not intended to imply that fixed decimal values are used. The present invention may be implemented using floating point decimals with a precision dependent upon the processor 10 and the degree of precision required to provide accurate calculations.

The data obtained from the process facility initially will not be in the form of multi-valued logic variables.

In the preferred embodiment, the data obtained by the data acquisition system 12 includes physical parameter values, such as temperature, pressure, flowrate, etc. and equipment states, such as pump on or off, valve closed or open, etc. Equipment states may provide more information, such as a valve which is 75% open or a pump operating at a certain rate. This plant data is converted into multi-valued logic variables for calculation of congruence factors which is discussed below. This conversion process may be performed by the data acquisition system 12 or by the processor 10 upon receipt of the plant data from the data acquisition system 12, if the data acquisition system 12 does not have sufficient processing capability to perform the conversion.

Figure 2A:
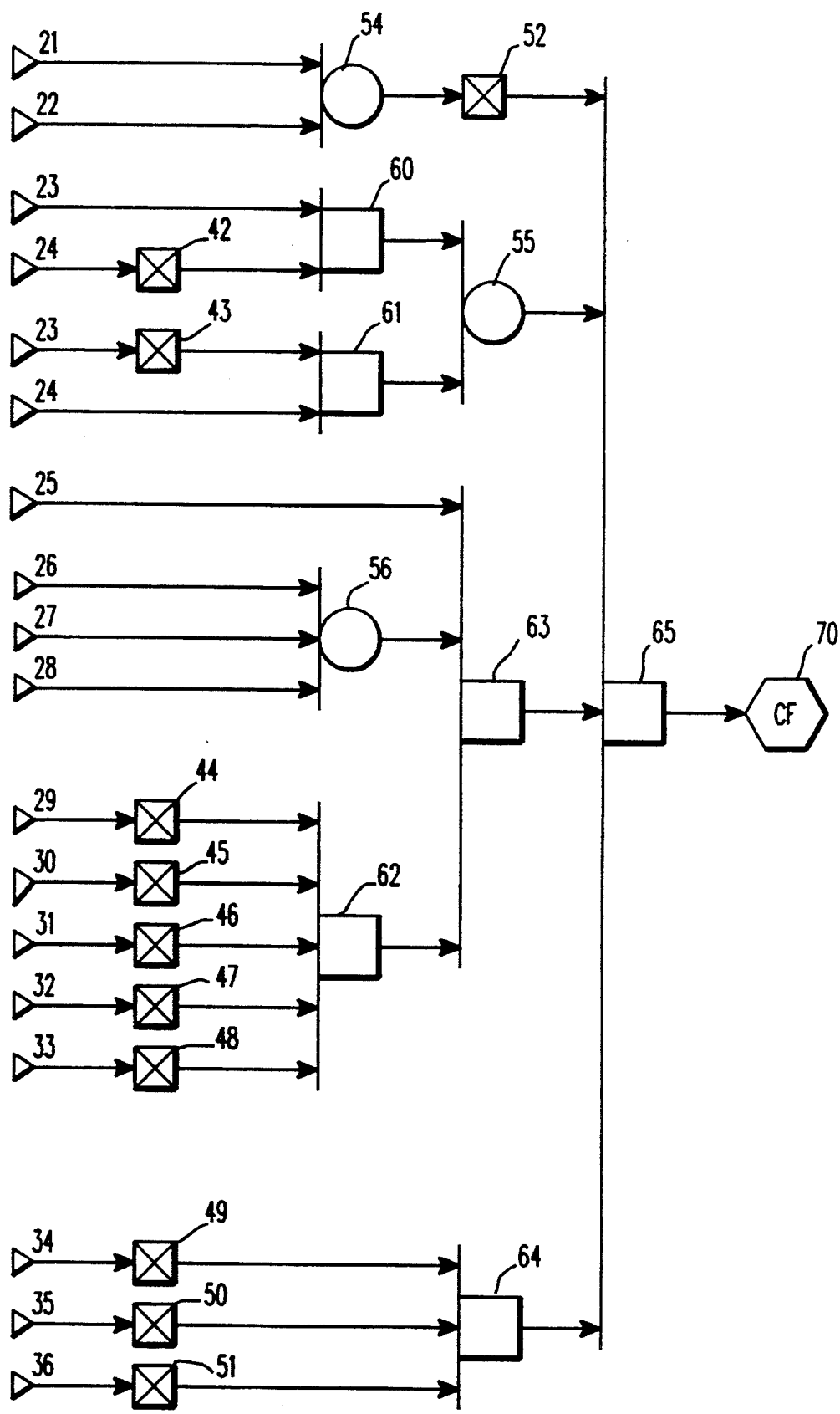
FIG. 2A is a logic diagram illustrating calculation of a congruence factor for a plant state according to the present invention.

In a substantially conventional manner, the data from the process facility is converted into logic variables indicating the truth or falsehood of a condition in the plant, but the values assigned are numerical and may have more than two values. An illustration of a relationship defining the calculation of a congruence factor for one of the steps in the start up of a coal-fired power plant is illustrated in FIG. 2A. The multi-valued logic variables used in this relationship are supplied as inputs as represented by the triangles 21–36 at the left side of FIG. 2A. Referring to FIGS. 2A and 2B, as an example, the value provided at input gate 25 indicates whether valve 207 is more than 30% open. The data from the sensors on valve 207 may be compared with calibration data for valve 207 to determine how far open is valve 207. If the data indicates that valve 207 is completely closed, the value input at input gate 25 will be $-1.0$. On the other hand, if the data indicates that the valve is 25% open, a value of 0.5 might be supplied, because it is "close" to the expected value of 30% open. If the data indicates that the valve is 50% open, the value supplied at 25 will be $+1.0$. The data for the other inputs are obtained in a similar manner.

In a complex processing facility, particularly one with potential hazard, such as an electrical power generating plant, it is common to have redundant sensors for many of the items of data. For example, there may be three temperature or pressure sensors in close proximity which should provide the same readings. When the redundant sensors do not agree or there is some other reason to doubt the quality of data, the value assigned to the corresponding multi-valued logic variable may be modified. For example, instead of assigning a value of $+1.0$ to a multi-valued logic variable indicating that temperature is greater than 400° F. in the primary superheater, the multi-value logic variable may be assigned a value of $+0.7$ if two of three temperature sensors in the primary superheater indicated a temperature of 410° F. and the third indicated a temperature of 380° F.

Figure 3:
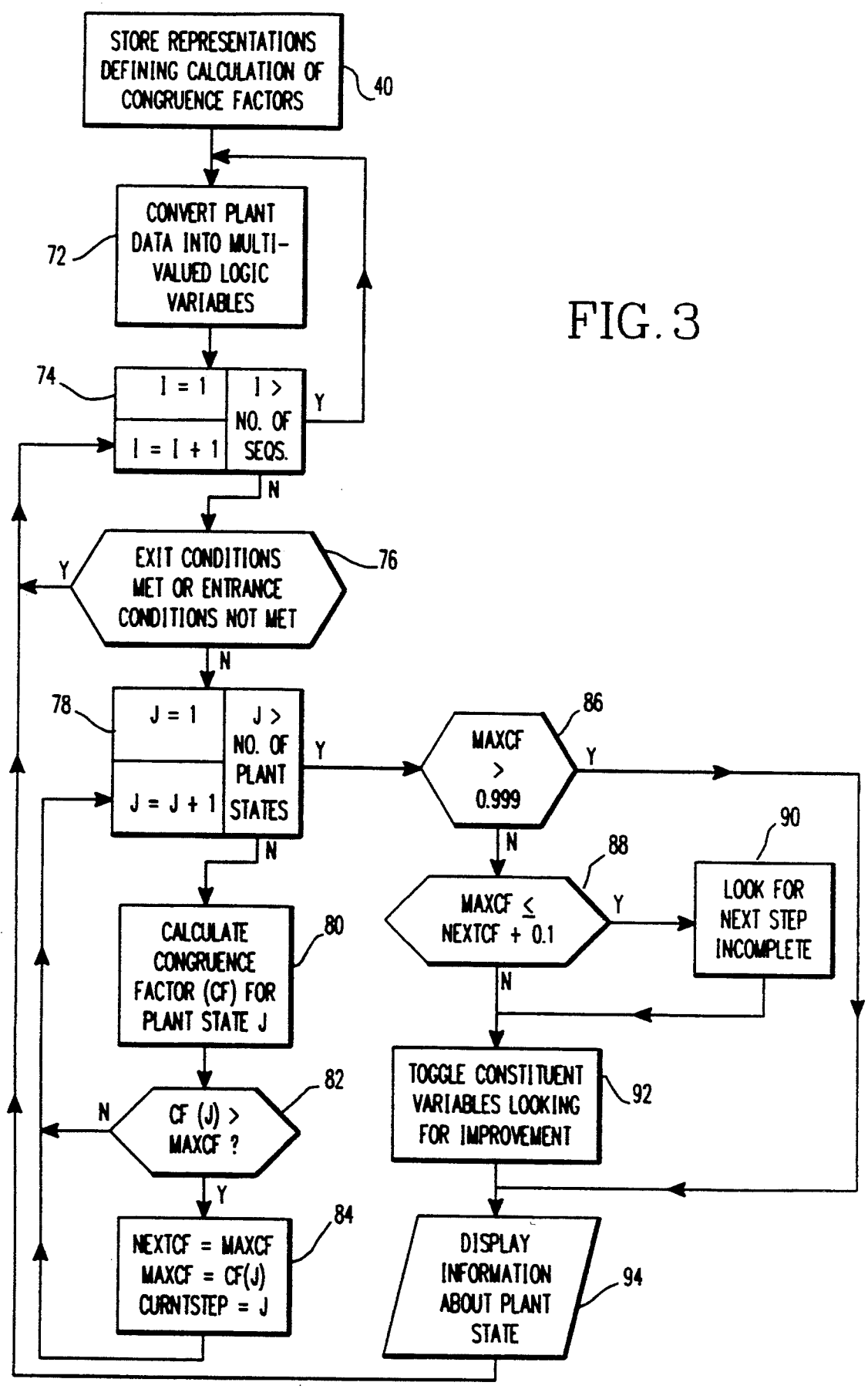
FIG. 3 is a flowchart of a method according to the present invention.

A flowchart of a method according to the present invention is illustrated in FIG. 3. As indicated in FIG. 3, a first step 40 is to store representations of expected or hypothesized plant states, defining calculation of congruence factors. The representation of a hypothesized plant state may take many forms. A logic diagram of one plant state is illustrated in FIG. 2A. The same representation of a plant state may also be written as a logical expression that is evaluated arithmetically; for example, the plant state illustrated in FIG. 2A may be represented by equation (1) as discussed below in more detail. The logical or arithmetic expressions may be formed by a program capable of converting logic diagrams into logical expressions, by a program which converts tables into logical (arithmetic) expressions, or hand-coded.

$$(-\text{MAX2}(LV21, LV22) + \text{MAX2}((LV23 - LV24)/2., \quad (1)$$

$$(LV24 - LV23)/2.) + (LV25 + \text{MAX3}(LV26, LV27, LV28) +$$

$$(-LV29 - LV30 - LV31 - LV32 - LV33)/5.)/3. +$$

$$(- LV34 - LV35 - LV36)/3.)/4.$$

Such programs are easily provided by one of ordinary skill in the art. The logical (arithmetic) expression may be stored as one or more lines of code in a program written in FORTRAN, PASCAL, or any other appropriate programming language. Alternatively, the logical (arithmetic) expressions may be stored in a database, permitting the expressions to be easily updated, and another program used to evaluate the expressions.

In the exemplary representation of a plant state illustrated in FIG. 2A, the input gates 21–36 indicate a degree of truth (or falsehood) of the statements indicated in Table 1 of FIG. 2B below. The small boxes 42–52 correspond to NOT functions which invert the sign of the value of the logic variable. For example, if the output of input gate 35 is 0.7 (because only two of three temperature sensors indicate a temperature greater than 400° F.), the output of gate 50 will be $-0.7$, indicating that it is unlikely that the temperature is below 400° F.

The basic logic gates used in diagraming a representation of a plant state according to the present invention are fuzzy operators which replace Boolean OR and AND gates. The replacement for a Boolean OR gate is represented by a circle with a tangent line as indicated for gates 54''56 in FIG. 2A. The fuzzy logic gate replacing a Boolean AND gate is represented by a square with a line segment extending one of its sides, as indicated by gates 60–65.

While the gates in a fuzzy logic representation according to the present invention are similar to Boolean OR and AND gates, they're implemented using functions which are different from those used in Boolean logic. In the preferred embodiment, the fuzzy logic equivalent of a Boolean AND gate is an average function. This allows all of the data supplied as input to a fuzzy AND gate to have an effect on the output of the gate. It should be noted that conventional fuzzy logic uses a minimum function as a fuzzy equivalent of a Boolean AND. A minimum function is not used in the preferred embodiment because insufficient information about the degree of congruence would be provided.

A fuzzy OR gate ordinarily returns the maximum value of the inputs supplied thereto. However, due to the use of negative values to indicate varying degrees of falsehood, if none of the inputs to a fuzzy OR gate are significantly true, a maximum value function could supply a value close to zero, indicating a great deal of uncertainty, even though many of the inputs to the OR gate are significantly false. For example, if the value supplied by input gates 26 and 27 is $-1.0$, while input gate 28 supplies a value close to zero (e.g., due to a sensor that has been determined to have failed), gate 56 would output the value of input gate 28, i.e., approximately zero, even though using the best knowledge available, the output of gate 56 should indicate a significantly false value. Therefore, the fuzzy OR gate in the preferred embodiment is implemented as a modified maximum value function which returns the average of the input if the maximum value is close to zero, e.g., having an absolute value of 0.05 or less. Thus, in the example given above the output of gate 56 would be approximately −0.66 instead of approximately 0.

As a result of the definitions used for the multi-valued "fuzzy" logic, a system according to the present invention has inherent flexibility which enables a system according to the present invention to distinguish between successive plant states that may be very similar. As in the case of any system with such capabilities, the creation of the representations of plant states requires the exercise of judgment on the part of the system designers and knowledge of the process facility. This task can be made easier by following the principles described below.

The flexibility of the present invention permits some data to be given greater weight than other data. Generally speaking, the most important data in identifying a plant step in a sequence of operations is that one step is completed and an immediately following step is not yet complete. The most recently completed step will be referred to as the current step and the immediately following step will be referred to as the next step. Other information which is of slightly less importance is that steps previous to the current step have been completed and that the physical parameters reflect completion of the current step.

The use of logic diagrams in the design of plant state representations permits the representations to be checked more easily and if a simple program is used to convert the logic diagram to a logical expression, errors in coding the logic expressions are eliminated. Design of a system of logic diagrams is further facilitated by structuring the diagrams. The end result of the calculations for each logic diagram is a congruence factor (CF) 70. Since several pieces of information must be true in order for the congruence factor 70 to have a high value (near +1.0), the final logic block in all of the logic diagrams will be a fuzzy AND gate, such as gate 65 in FIG. 2A. The inputs to gate 65 may be structured with the incompletion of the next step represented by NOT gate 52. In the plant state illustrated in FIG. 2A, the next step to be completed is to bring one of the boiler feed pumps 201 or 202 up to a predetermined rpm. This is represented by the output of fuzzy OR gate 54.

Completion of the current step should have a weight similar to incompletion of the next step. Completion of the current step is represented by fuzzy OR gate 55. The current step is to turn on one of boiler feed pumps 201 or 202, but not both.

The steps previous to the current step include opening valve 207, turning on one of condensate pumps 210, 220 or 230 and closing all of valves 200-1, 200-2, 204A-1, 204A-2, and 205. Since these steps should be given less weight, gates 25, 56 and 62 indicating completion of these three steps are averaged together by fuzzy AND gate 63 prior to being supplied to the final fuzzy AND gate 65. Thus, these three steps together have the same weight as each of the next and current steps.

The physical parameters are important, but generally are not as important in identifying plant state as are changes in equipment state. Therefore, the physical parameters of pressure, temperature and cation conductivity supplied by gates 34–36 are supplied to a fuzzy AND gate 64 (after being inverted), so that all three physical parameters are averaged together to be given the same weight as each of the current and next steps in the final fuzzy AND gate 65. In some steps, a physical parameter may be of great importance. In such a case, the system designers would exercise their judgment to supply the value of that parameter directly to the final fuzzy AND gate. If even greater weight is required for one of the logic variables, additional AND gates could be used to average the other intermediate logic variables, prior to being combined with the more important logic variable in the final fuzzy AND gate. For example, if the step illustrated in FIG. 2A most easily identified as different from other steps due to the fact that it was the only step in which the primary superheater pressure was more than 900 psig, another input gate, indicating this condition, could be added to FIG. 2A and combined with the output of gate 65 in a new final fuzzy AND gate to define the congruence factor 70.

With reference to FIG. 3, after the representations of plant states have been stored 40 to define calculations for the congruence factors, a system according to the present invention can be used to monitor a process facility. The data obtained by the data acquisition system 12 is converted 72 into multi-valued logic variables as described above. The system may be used to monitor only a single simple sequence of steps, in which case the next two blocks in FIG. 3 are not required. However, complex process facilities often have several, partially independent, operations going on simultaneously. In the preferred embodiment, these partially independent operations are stored as separate sequences with entrance and exit conditions. The entrance and exit conditions may be used to require completion of one sequence at one location in the facility prior to beginning another sequence at a different location in the facility. For example, when starting a nuclear reactor power plant after routine maintenance, the reactor and its cooling system is partially independent from the secondary equipment, i.e., the turbines and generators. Initially, nothing is done to the secondary equipment, while the nuclear reactor heats up. Once the steam temperature and pressure reach certain values, such as 450° F. and 1000 psig, a sequence of operations may begin on the secondary side. Thus, two sequences which could be stored in step 40 would include the sequence of operations performed on the reactor, having a simple entrance condition, such as condenser available, and another sequence for the secondary side having entrance conditions of temperature greater than 450° F. and pressure greater than 1000 psig. The exit conditions for the secondary side sequence might be turbine speed of greater than 500 rpm.

An iteration block 74 steps through each of the sequences. In decision block 76, if the exit conditions are met or the entrance conditions have not yet been met, no evaluation is performed for that sequence and the next sequence in the iteration loop controlled by block 74 is tested. If the entrance conditions have been met, but not the exit conditions, each of the plant states in that sequence is checked under the control of iteration block 78. For each plant state in an active sequence, a congruence factor is calculated 80. In the loop controlled by iteration block 78, the highest and second highest congruence factor in the sequence may be determined by comparing 82 a just calculated congruence factor with the highest previously calculated congruence factor. If the just calculated congruence factor corresponding to plant state J, is smaller than the highest previously calculated congruence factor, indicating that a hypothesized plant state tested earlier in the J loop presents a better match to actual plant conditions than does plant state J, the logic flow returns to block 78 to increment index J and continue on through the set of hypothesized plant states. If the just calculated congruence factor, corresponding to plant state J, is equal to or greater than the highest previously calculated congruence factor, indicating that hypothesized plant state J provides the best match found so far to the actual plant conditions, this is acknowledged by updating 84 the highest congruence factor and indication of current step before returning to block 78, as indicated in FIG. 3. The same result can be obtained in many other ways, e.g., by calculating all of the congruence factors first and then comparing or sorting the congruence factors. If the maximum congruence factor for a particular hypothesized state in a planned sequence is very close to the maximum possible congruence factor, e.g., 0.999 as indicated in decision block 86, no further analysis need be performed as discussed below. However, if the congruence factor is lower, further analysis is preferably performed as discussed below.

Figure 4:
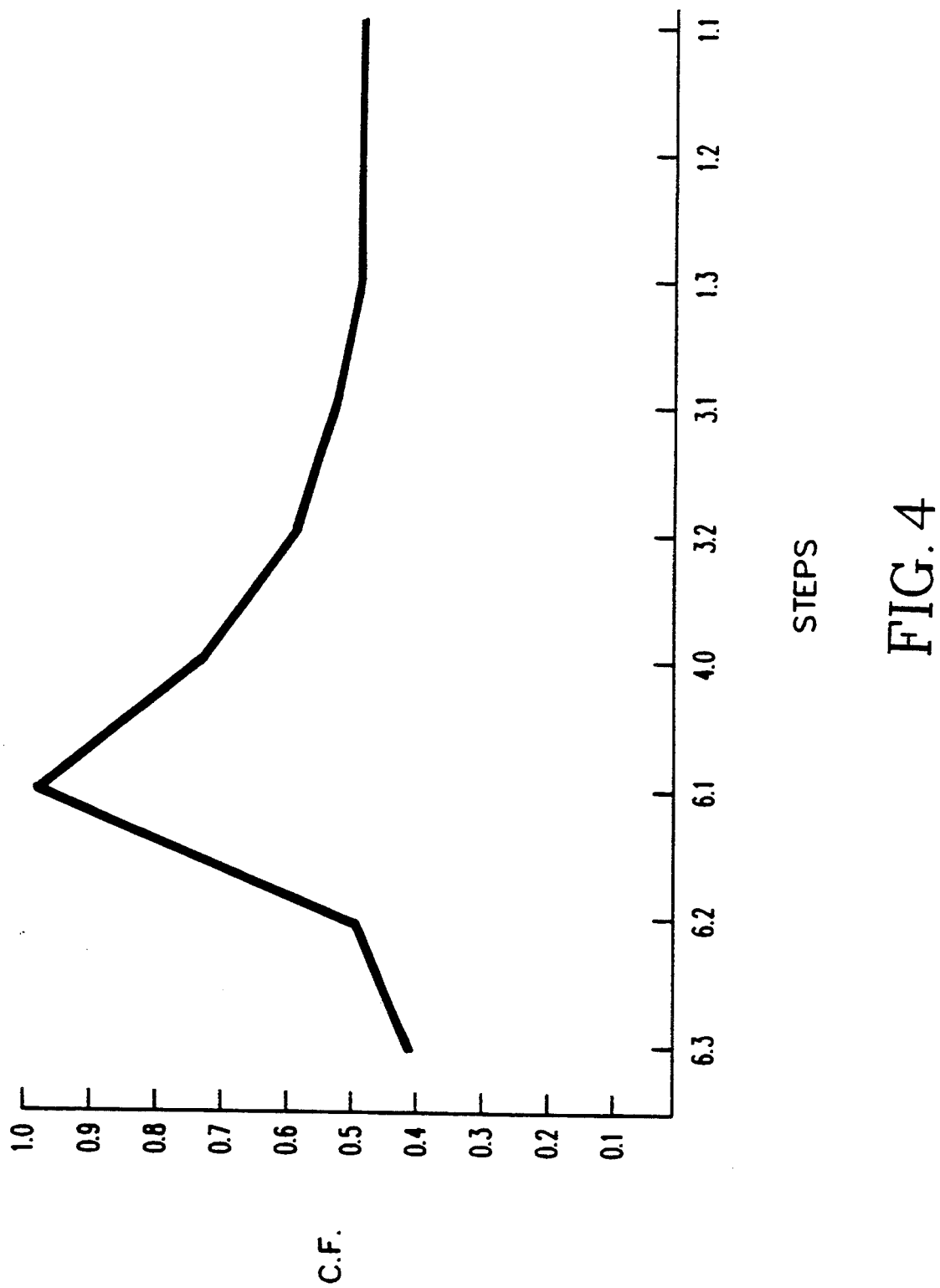
FIG. 4 is a graph of congruence factors for a sequence of plant states upon completion of step 6.1 of a facility startup procedure.

A diagram of congruence factors for a sequence of steps is illustrated in FIG. 4. The numerical designations on the abscissa are from an existing written procedure and steps 2 and 5 are performed on different equipment which are not part of the sequence stored in step 40. The steps could have been plotted in ascending order as well as the illustrated descending order. The diagram illustrated in FIG. 4 indicates the significant difference between the most recently completed step 6.1 and the step with the next highest congruence factor which is the immediately preceding step 4.0. This result is obtained due to the large weight given incompletion of the next step. Since step 6.1 is complete, when the congruence factor for step 4.0 was calculated, the input to the final fuzzy AND gate for "next step incomplete" was false. As a result of using the structured design of the logic diagrams discussed above, even if the other three inputs to the final fuzzy AND gate were true, the resulting congruence factor could be no higher than 0.75 and in the situation illustrated in FIG. 4, step 4.0 has a congruence factor close to this value.

Figure 5:
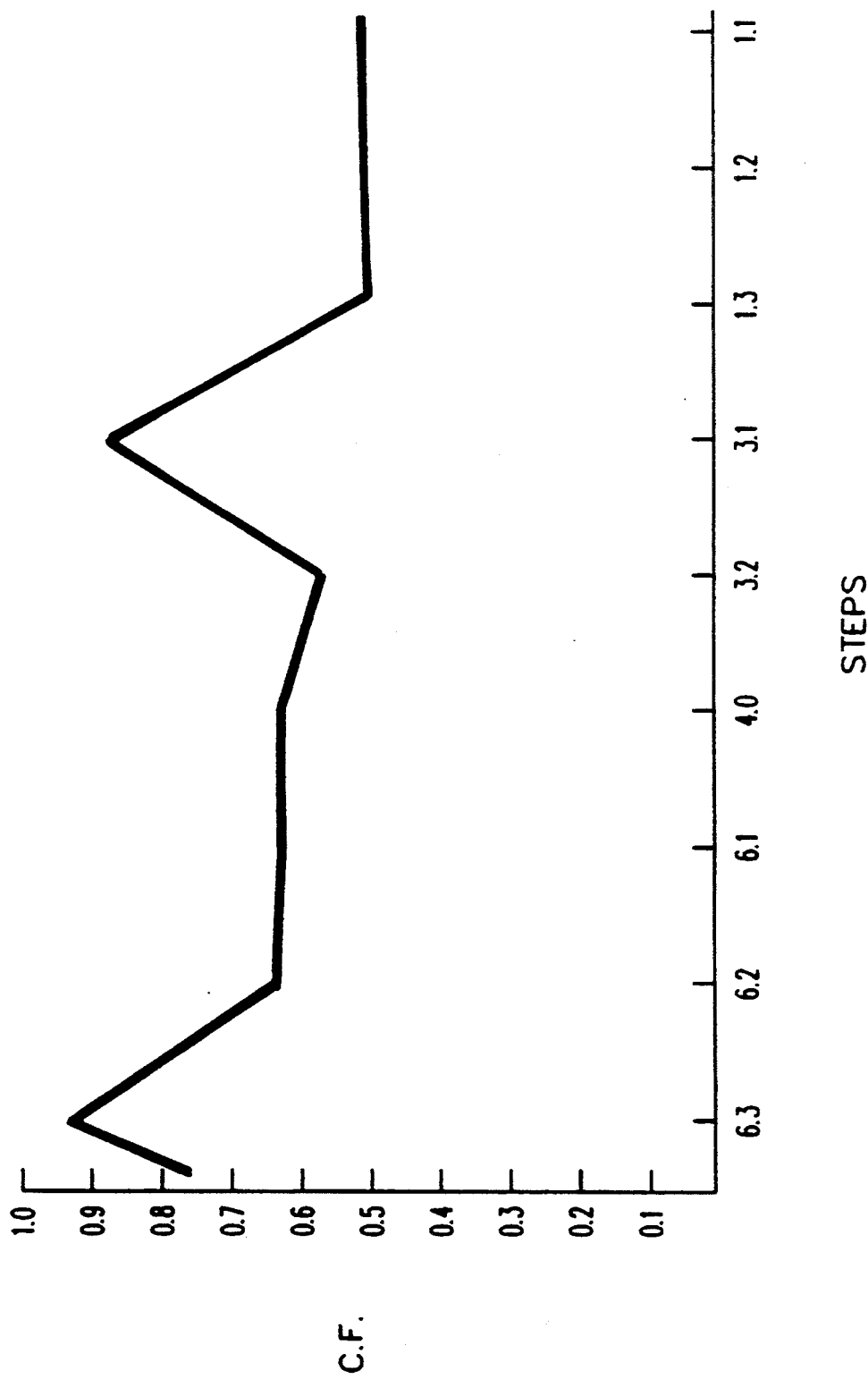
FIG. 5 is a graph of congruence factors following an upset after completion of step 6.3 of a facility startup procedure.

During execution of a planned sequence of operations, the procedure is not always executed smoothly. FIG. 5 illustrates a situation where a deviation has occurred after step 6.3 of the sequence illustrated in FIG. 4 was completed, i.e., a signal was received indicating that one of the pumps tripped, or stopped operating. This pump was initially turned on in step 3.2 and is not included in any of the input variables for calculating the congruence factor of step 6.3. However, the physical parameters have been affected by the pump trip and as a result the congruence factor of step 6.3 is only 0.95. Since step 3.1 has been completed, but the pump which is to be turned on in step 3.2 is not on, the congruence factor for step 3.1 is fairly high.

The analysis performed when the maximum congruence factor is not very close to 1.0 takes situations like those illustrated in FIG. 5 into consideration. One way to accomplish this is to compare block 88 the maximum congruence factor with the next highest congruence factor. If the value of the maximum identified congruence factor among the entire set of hypothesized plant states exceeds the next highest identified congruence factor value by a predetermined amount, such as 0.1, the hypothesized plant state corresponding to the maximum identified congruence factor is considered to be the single best match to actual plant conditions and the logic flow passes directly to block 92 and then displayed, block 94. If the value of the highest identified congruence factor and that of the next highest congruence factor are within a predetermined amount, such as 0.1, the steps in the sequence are checked 90 for an incomplete next step. Since step 3.1 is the lowest step having an incomplete next step, the operator would be informed that step 3.2 needs to be performed before proceding to block 92. In addition to performing the steps represented by blocks 88 and 90, the plant states stored in step 40 may include not only all of the steps which should be performed, but also "upsets" or deviations from expected or hypothesized plant states which have been experienced before or are otherwise identified as possible. An upset plant state corresponding to the situation illustrated in FIG. 5 would have a higher congruence factor than step 6.3 and thus the messages related to that upset would be displayed to the operator before proceding to block 92.

In a situation which does not show the "double-humped" distribution illustrated in FIG. 5, the maximum congruence factor could be well below 1.0, but well above the next closest congruence factor. In such a situation, the constituent variables used to calculate the congruence factor for the current state are "toggled" 92 or temporarily changed in value to determine which variables could be changed to improve the congruence factor. An improvement in the congruence factor would indicate that the data corresponding to these variables is not as expected. In the example illustrated in FIG. 2A, if cation conductivity is greater than 1 micromho, toggling the input of block 36 will slightly improve the congruence factor. In this case, the system would inform the operator that cation conductivity is high and could suggest how to reduce it.

As in the above-discussed case of structuring the logic diagrams representing hypothesized plant states to ensure proper results, "toggling" analysis may be developed using the following rules. When a congruence factor is subjected to "toggling" analysis, the input values should be tested to determine their absolute value. If the preferred range of $-1.0$ to $+1.0$ is used, inputs having a value close to 0.0 indicate that the data related to that input is "bad". The operator can be informed of the "bad" quality of the data, so that alternative sources of information regarding this data can be obtained. For example, if the data is superheater pressure, there may be manual gauges which can be checked. The interface between a computerized system according to the present invention and the operator may permit the operator to modify an input, based on data obtained manually. In addition, input values close to zero can be "toggled" to $+1.0$ and $-1.0$ to determine the effect of the "bad" input on the congruence factor. If a congruence factor very close to 1.0 is obtained by toggling, then the operator can be reasonably sure that the bad data quality of the input(s) is the cause of the low congruence factor and the identified plant state is most likely the current plant state. Obviously, if more than one input has a value close to 0.0, the "toggling" operation must include toggling of all of the "bad" inputs using values of $-1.0$ and $+1.0$.

If none of the input values are close to 0.0, but one or more inputs have an absolute value close to 0.5 and input values are assigned using overlapping ranges, the problem may be that the raw data is outside an expected range, but inside a larger range. In the example given above for a valve 30% open, when the valve was 25% open, the input value was assigned 0.5. To determine whether a situation like this is the cause of the low congruence factor, each input having a value close to 0.5 is first "toggled" by increasing the absolute value to 1.0 without changing the sign and then reversing the sign while maintaining the absolute value at 1.0. If the congruence factor increases in the first operation and decreases in the second operation, the operator can be reasonably certain that the cause of the low congruence factor is a slightly out-of-range input. Therefore, the system should inform the operator which input(s) are slightly out of range. Once again, if more than one input has a value close to 0.5, the first and second operations need to be analyzed to determine the highest possible congruence factor using "toggling" analysis on all such inputs.

If all of the input values are close to +1.0 or −1.0, it is likely that one or more of the inputs are not in the expected state. In this case, each of the inputs are "toggled" by reversing their sign and the congruence factor is reevaluated for each. If the congruence factor is increased, but does not reach 1.0, the process may be repeated for all inputs, except the input which was changed to increase the congruence factor. In this fashion, one or more inputs could be identified to the operator as not matching the hypothesized plant state.

Information obtained from analysis using "toggling" is displayed 94 to the operator along with other information which has been determined, such as the current state, the next step to be performed, the congruence factor, etc. In displaying this information, a different range, such as 0.0 to +1.0 could be used, particularly for the congruence factor, since a congruence factor of zero can be more intuitively understood to mean a total mismatch. The other information displayed may include data which is not used to identify the plant state. The information used to identify plant states is chosen by system designers to clearly distinguish one plant state from another. Information which may be important to a plant state, but not provide significant differentiation from one or more other steps may be included in the information displayed to the operator. After this, return to block 74.

Tests of a system according to the present invention have shown that when the plant state representations are carefully designed, degradation in signal quality have at most half the effect of a change in state of a variable. This is a result of the use of the range −1.0 to +1.0 with the value 0.0 indicating maximum uncertainty or bad quality of data. As a result, the present invention has a high tolerance for data uncertainty while providing accurate identification of plant states. However, similar results may be obtained using equivalent data value ranges. For example, the more conventional range of 0.0 to 1.0 could be used with 0.5 indicating maximum uncertainty of data, or even a range of 10 to 100 could be used. However, if a different range is used, it will be necessary to adjust the values assigned to and used for testing the logic variables and implementation of the AND, OR and NOT operators will have to be changed to obtain appropriate response from a system according to the present invention. For example, if the range 0.0 to 1.0 is used, the NOT operator becomes (1−input) and the AND and OR operators have other changes.

The many features and advantages of the present invention are apparent from the detailed specification, and thus it is intended by the appended claims to cover all such features and advantages of the system which fall within the true spirit and scope of the invention.

Further, since numerous modifications and changes will readily occur to those skilled in the art from the disclosure of this invention, it is not desired to limit the invention to the exact construction and operation illustrated and described, accordingly, suitable modifications and equivalents may be resorted to, all falling within the scope and spirit of the invention.

What is claimed is:

1. A method for monitoring operation of a process facility comprising the steps of:
   (a) storing at least one planned sequence of hypothesized plant states using multi-valued logic to define calculation of a congruence factor for each of the hypothesized plant states; wherein said storing in step (a) includes storing relationships between the multi-valued logic variables defined by a maximum value function when any of the multi-valued logic variables in a first relationship may be true and defined by an average function when all of the multi-valued logic variables in a second relationship are expected to be true;
   (b) converting data representing the process facility into values of multi-valued logic variables; wherein said converting in step (b) assigns to the multi-valued logic variables numerical values corresponding to likelihood of truth;
   (c) calculating the congruence factor from the multi-valued logic for each of the hypothesized plant states in step (a) in the at least one planned sequence using the multi-valued logic variables; and
   (d) identifying a current plant state by comparing the congruence factor of each of the hypothesized plant states to each other and choosing the plant state having the highest congruency factor.

2. A method as recited in claim 1, further comprising the step of (e) displaying information about the current plant state in dependence upon the values of the multi-valued logic variables regardless of whether the information is used in said identifying in step (d).

3. A method as recited in claim 1, wherein said storing in step (a) defines the calculation of the congruence factor for a first set of the hypothesized plant states corresponding to steps in a procedure associated with the planned sequence and a second set of the hypothesized plant states corresponding to predetermined deviations from the first set of the hypothesized plant states.

4. A method as recited in claim 1, wherein said storing in step (a) defines unique calculations to produce a single number as a congruence factor for each of the hypothesized plant states.

5. A method as recited in claim 4,
   wherein said identifying in step (d) determines the current plant state as having a maximum congruence factor among the hypothesized plant states, and
   wherein said method further comprises the steps of:
   (e) temporarily changing the values of the multi-valued logic variables used in calculating the congruence factor of the current plant state, one variable at a time, when the congruence factor of the current plant state is less than a maximum possible congruence factor by more than a predetermined amount;
   (f) recalculating the congruence factor for the current plant state for each change in step (e); and
   (g) determining how changes in the multi-valued logic variables could improve the congruence factor of the current plant state in dependence upon said recalculating in step (f).

6. A method as recited in claim 1,
wherein said converting in step (b) includes converting the data to the values of the multi-valued logic variables in a range of −1.0 representing certainly false to +1.0 representing certainly true with 0.0 representing total uncertainty, and
wherein the maximum value function used in said storing in step (a) returns an average of the values of the multi-valued logic variables in the first relationship instead of any maximum value within a predetermined amount of 0.0.

7. A method as recited in claim 6, further comprising the step of (e) displaying, when the congruence factor of the current state is less than 1.0 by a predetermined amount, at least one reason from among possible reasons for an imperfect match, the possible reasons including at least one of the multi-valued logic variables, used in the calculation of the congruence factor, having an absolute value not greater than one.

8. A method as recited in claim 1,
wherein said storing in step (a) includes storing a plurality of planned sequences, each of the planned sequences having entrance and exit conditions,
wherein said calculating in step (c) is performed only for the planned sequences having entrance conditions evaluated as true and exit conditions evaluated as false, where true and false are each defined as a range of values in the multi-valued logic, and
wherein said identifying in step (d) is performed to identify the current plant state in each of the planned sequences evaluated by said calculating in step (c).

9. A method as recited in claim 8, further comprising the step of (e) displaying sets of messages, each set corresponding to one of the planned sequences, the messages providing information about the current plant state of corresponding sequence in dependence upon the values of multi-valued logic variables regardless of whether the information is used in said identifying in step (d).

10. A method as recited in claim 1, wherein said storing in step (a) includes defining the calculation of the congruence factor for each of the hypothesized plant states corresponding to steps in a procedure associated with the planned sequence, as including completion of a corresponding step and incompletion of a next step.

11. A method recited in claim 10, wherein said storing step (a) further includes defining the calculation of the congruence factor as also including completion of previous steps.

12. A method as recited in claim 11, wherein said storing in step (a) further includes defining the calculation of the congruence factor as also including physical parameters in expected ranges at the completion of the corresponding step.

13. A method as recited in claim 12, wherein said storing step (a) includes structuring the calculation of each of the hypothesized plant states to give greater weight to the corresponding and next steps than to any of the previous steps and physical parameters.

14. A method as recited in claim 13, wherein said storing in step (a) includes ending the calculation of the congruence factor for each of the hypothesized plant states with the average function.

15. A method as recited in claim 12,
wherein dais identifying in step (d) determines the current plant state as having maximum congruence factor among the hypothesized plant states, and
wherein said method further comprises the steps of:
(e) temporarily changing the values of the multi-valued logic variables used in calculating the congruence factor of the current plant state, one variable at a time, when the congruence factor of the current plant state is less than a maximum possible congruence factor by more than a predetermined amount;
(f) recalculating the congruence factor for the current plant state for each change in step (e);
(g) determining how changes in the multi-valued logic variables could improve the congruence factor of the current plant state in dependence upon said recalculating in step (f); and
(h) displaying information representing the current plant state identified in step (d) and deviations therefrom in dependence upon said determining in step (g).

16. A method as recited in claim 15, wherein said identifying in step (d) includes checking the hypothesized plant states, having high congruence factors higher than all other hypothesized plant states, for one of the multi-valued logic variables indicating the next step is not completed, when the congruence factors of two of the hypothesized plant states are within a predetermined number.

17. A monitoring system for an electrical power generating plant comprising:
a storage unit to store planned sequences of hypothesized plant states, each plant state defined by a congruence factor calculated using multi-valued logic;
a data acquisition and conversion system to repeatedly obtain plant data and convert the hypothesized plant data representing the electrical power generating station into multi-valued logic variables;
a processor to determine at least one current sequence as likely in progress from among the planned sequences stored in said storage unit, to calculate the congruence factor from the multi-valued logic for each hypothesized plant state in each of the at least one current sequence and to identify a current plant state for each of the at least one current sequence based on a highest congruence factor; wherein said processor determines the at least one current sequence as having entrance conditions evaluated as true and exit conditions evaluated as false, wherein true and false are each defined as a range of values in the multi-valued logic; and
a display unit to display information about the current plant state in dependence upon the values of the multi-valued logic variables regardless of whether the information is used to identify the current plant state.

* * * * *